(12) United States Patent
Cloft et al.

(10) Patent No.: US 8,657,567 B2
(45) Date of Patent: Feb. 25, 2014

(54) NACELLE COMPARTMENT PLENUM FOR BLEED AIR FLOW DELIVERY SYSTEM

(75) Inventors: Thomas G. Cloft, Glastonbury, CT (US); Ashok K. Jain, Tempe, AZ (US)

(73) Assignee: United Technologies Corporation, Hartford, CT (US)

( * ) Notice: Subject to any disclaimer, the term of this patent is extended or adjusted under 35 U.S.C. 154(b) by 1979 days.

(21) Appl. No.: 11/754,455

(22) Filed: May 29, 2007

(65) Prior Publication Data

US 2008/0298950 A1    Dec. 4, 2008

(51) Int. Cl.
F03B 15/06    (2006.01)
F02C 9/18    (2006.01)

(52) U.S. Cl.
USPC .......................... 415/145; 415/220; 415/914

(58) Field of Classification Search
USPC ................... 415/220, 221, 914, 144, 145
See application file for complete search history.

(56) References Cited

U.S. PATENT DOCUMENTS

| 2,636,666 | A | * | 4/1953 | Lombard ........................ 55/306 |
| 3,566,606 | A | * | 3/1971 | Mortlock ..................... 60/226.1 |
| 4,658,579 | A | | 4/1987 | Bower |
| 4,738,416 | A | | 4/1988 | Birbragher |
| 4,749,151 | A | | 6/1988 | Ball et al. |
| 5,114,103 | A | | 5/1992 | Coffinberry |
| 5,447,283 | A | * | 9/1995 | Tindell .......................... 244/207 |
| 5,490,644 | A | | 2/1996 | Koncsek |
| 5,568,724 | A | * | 10/1996 | Lindner et al. .................. 60/204 |
| 5,593,112 | A | | 1/1997 | Maier |
| 5,841,079 | A | * | 11/1998 | Parente .......................... 181/214 |
| RE36,215 | E | * | 6/1999 | Rosenthal .................. 244/134 B |
| 5,934,611 | A | * | 8/1999 | Tindell et al. ............... 244/53 B |
| 6,264,137 | B1 | | 7/2001 | Sheoran |
| 6,438,941 | B1 | | 8/2002 | Elliott |
| 6,651,929 | B2 | | 11/2003 | Dionne |
| 6,708,711 | B2 | | 3/2004 | Surply et al. |
| 6,763,651 | B2 | * | 7/2004 | Shmilovich et al. ....... 60/39.092 |
| 6,848,656 | B2 | | 2/2005 | Linton |
| 6,851,255 | B2 | * | 2/2005 | Aitchison et al. ............ 60/39.83 |
| 6,945,031 | B2 | | 9/2005 | Lair |
| 7,870,721 | B2 | | 1/2011 | Winter et al. |
| 2005/0006529 | A1 | * | 1/2005 | Moe et al. .................. 244/134 D |
| 2005/0045774 | A1 | * | 3/2005 | Hocking ....................... 244/209 |
| 2005/0060982 | A1 | * | 3/2005 | Mani et al. ................... 60/226.1 |
| 2008/0112799 | A1 | * | 5/2008 | Winter et al. .................. 415/145 |
| 2009/0140104 | A1 | | 6/2009 | Surply et al. |

FOREIGN PATENT DOCUMENTS

| EP | 1627990 A2 | 2/2006 |
| EP | 1998029 A2 | 3/2008 |
| EP | 2009263 A2 | 12/2008 |
| WO | 2008045074 | 4/2008 |

OTHER PUBLICATIONS

European Search Report, dated Aug. 1, 2011.

* cited by examiner

*Primary Examiner* — Edward Look
*Assistant Examiner* — Jesse Prager
(74) *Attorney, Agent, or Firm* — Carlson, Gaskey & Olds, PC

(57) ABSTRACT

A gas turbine engine is provided with a nacelle having a hollow inner space. The inner space is utilized as a plenum for directing air from an inlet to an outlet at the upstream end of the nacelle to allow control of an effective lip width of the nacelle under certain flight conditions.

16 Claims, 2 Drawing Sheets

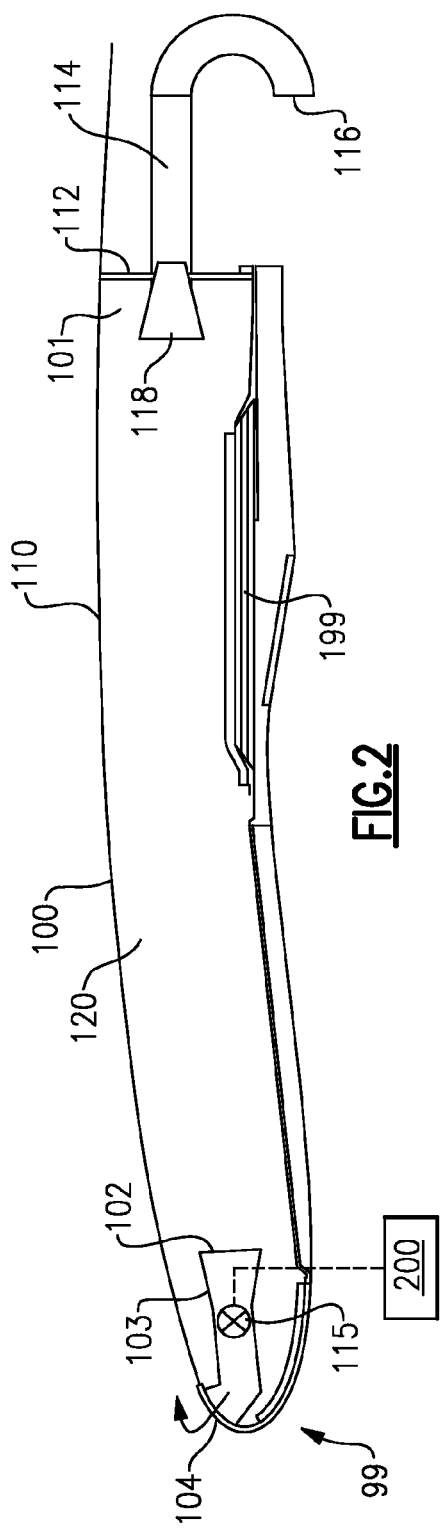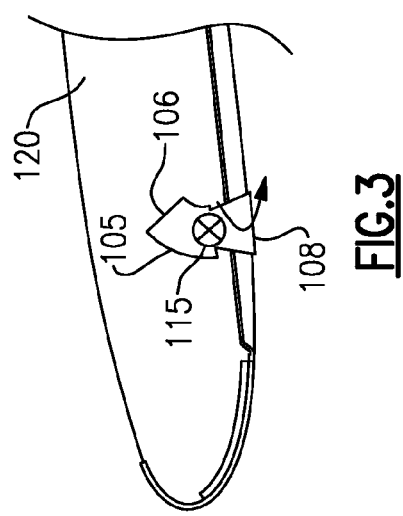

NACELLE COMPARTMENT PLENUM FOR BLEED AIR FLOW DELIVERY SYSTEM

BACKGROUND OF THE INVENTION

This invention generally relates to a gas turbine engine, and more particularly to a nacelle inlet for a turbofan gas turbine engine.

In an aircraft gas turbine engine, such as a turbofan engine, a fan delivers air to a compressor. The pressurized air is mixed with fuel in a combustor for generating hot combustion gases. The hot combustion gases flow downstream through a turbine stage, which extracts energy from the gas. The turbine powers the fan and compressor.

Combustion gases are discharged from the turbofan engine through a core exhaust nozzle and fan air is discharged through an annular fan exhaust nozzle defined at least partially by a nacelle surrounding the core engine. A majority of propulsion thrust is provided by the pressurized fan air which is discharged through the fan exhaust nozzle, while the remaining thrust is provided from the combustion gases discharged through the core exhaust nozzle.

It is known in the field of aircraft gas turbine engines that the performance on the turbofan engine varies during diverse flight conditions experienced by the aircraft. An inlet lip section located at the foremost end of the turbofan nacelle is typically designed to enable operation of the turbofan engine and prevent the separation of airflow from the inlet lip section of the nacelle during diverse flight conditions. For example, the inlet lip section requires a "thick" inlet lip section design to support operation of the turbofan during specific flight conditions, such as cross-wind conditions, take-off and the like. Disadvantageously, the "thick" inlet lip section may reduce the efficiency of the turbofan engine during other conditions, such as cruise conditions of the aircraft.

Accordingly, it is desirable to optimize the performance of a turbofan gas turbine engine during diverse flight requirements to provide a nacelle having a reduced thickness, reduced weight and reduced drag.

SUMMARY OF THE INVENTION

It has previously been proposed to selectively direct bleed air to locations adjacent the front of the nacelle to simulate a "thick" lip. At conditions when the thick lip is not necessary (e.g., cruise conditions), the bleed air is stopped. A continuous conduit captures air at a downstream end of the nacelle and delivers it to the upstream end.

In a disclosed embodiment, the interior of the nacelle is utilized as a plenum for bleed air being delivered to an outlet near the upstream end of the nacelle. An inlet pipe captures air from a bypass air flow, and directs that air into the interior of the nacelle. The air is directed into the plenum, and then into an inlet passage leading to the outlet at an upstream end of the nacelle. The bleed air could also be derived from any engine stages (fan, compressor, turbine, and or customer bleed ports) and may be mixed together to control the air temperature in plenum. In one embodiment, the outlet is at an outer surface of the nacelle. In an alternative embodiment, the outlet is in an interior surface. The inlet pipe is spaced from the outlet by the plenum.

These and other features of the present invention can be best understood from the following specification and drawings, the following of which is a brief description.

BRIEF DESCRIPTION OF THE DRAWINGS

FIG. 2 is a cross-sectional view through a first embodiment of this invention.
FIG. 3 is a view of a portion of the second embodiment of this invention.

DETAILED DESCRIPTION OF THE PREFERRED EMBODIMENT

Figure 1:
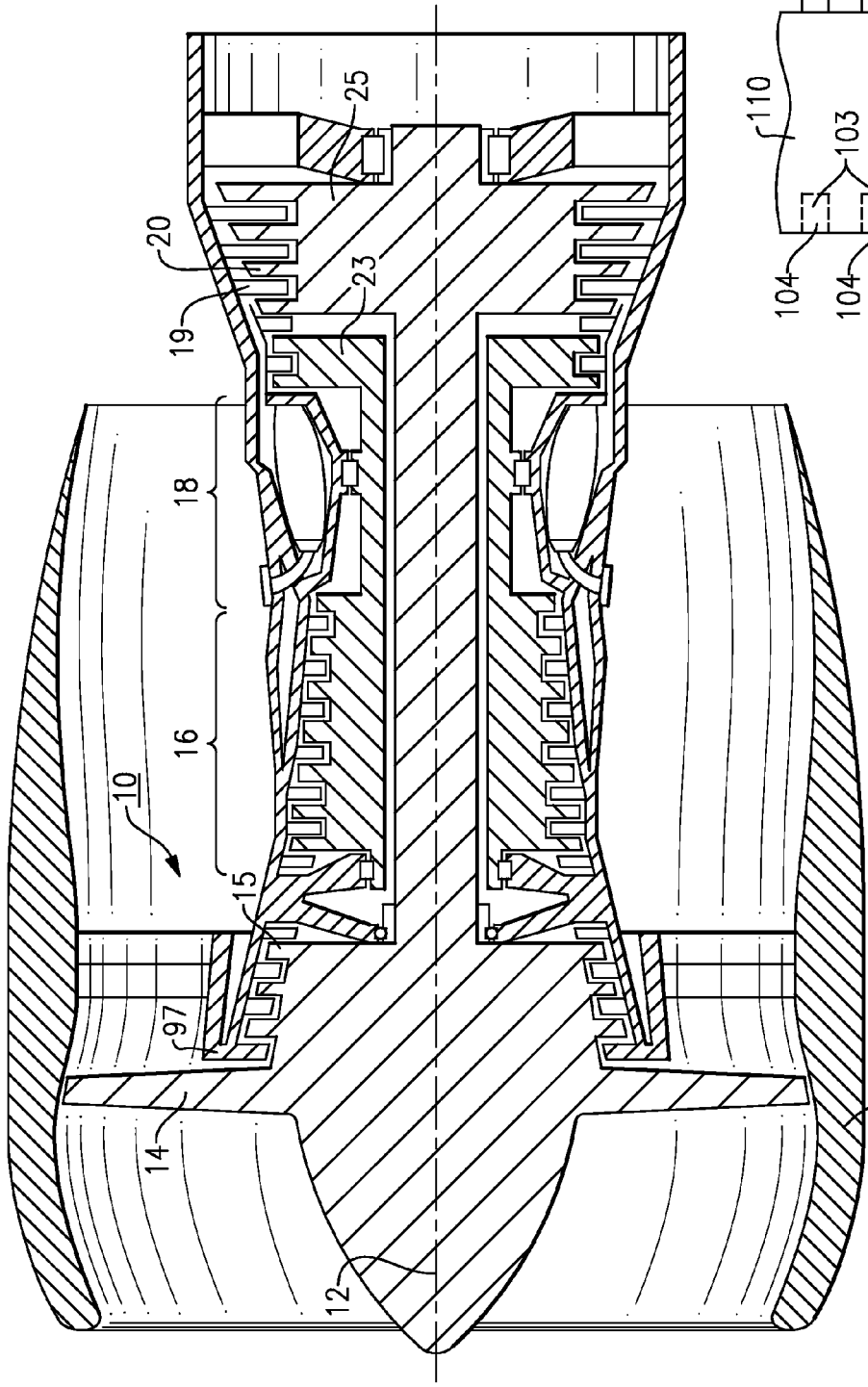
FIG. 1 schematically shows a turbofan gas turbine engine.

A gas turbine engine 10, such as a turbofan gas turbine engine, circumferentially disposed about an engine centerline, or axial centerline axis 12 is shown in FIG. 1. The engine 10 includes a fan 14, compressors 15 and 16, a combustion section 18 and turbine rotors 23 and 25. As is well known in the art, air compressed in the compressors 15 and 16 is mixed with fuel and burned in the combustion section 18, and expanded at turbine rotors 23 and 25. The air compressed in the compressor and the fuel mixture expanded in the turbine can both be referred to as a hot gas stream flow. The turbine rotors 23 and 25 include blades 20 and static airfoils or vanes 19. This structure is shown somewhat schematically in FIG. 1.

As shown in FIG. 1, a nacelle 100 surrounds the bypass air flow from the fan. A cowl 97 surrounds the interior components, and defines a bypass passage with the nacelle 100.

The nacelle 100 is shown in FIG. 2 to be generally hollow. Of course, there are components such as a fan control belt 199 within the nacelle. However, there is open communication in the nacelle between a downstream end 101 and an upstream end 99. In the FIG. 2 embodiment, an aft closure 112 closes off this space to define plenum 120. Fan cowl doors 110 are shown sealed to enclose the plenum 120. Doors 110 may be opened for various purposes. An inlet pipe 114 has an intake 116 and a diffuser outlet 118. Air from the bypass flow flows into the intake 116, and out a diffuser outlet 118 into the plenum 120. As shown in FIG. 2, an intake 102 for a pipe 103 directs air in the plenum to an outlet 104 at the outer periphery of the nacelle 100 at upstream end 99. This bleed air provides an effective boundary layer control to simulate a "thick lip" for various flight conditions. The direction of air could be in the illustrated direction, the opposite direction or at any different angle to the free stream air. To achieve selective control of the flow through this section, a valve such as valve 115 may be positioned on the pipe 103. A control 200 for achieving this selective control of the bleed air is shown schematically. A worker in the art would know when the thicker lip is desirable.

As is clear from FIG. 2, downstream of diffuser outlet 118, and within the plenum 120, the flow cross-sectional area increases. Then, the flow cross-sectional area decreases again as the air moves into the intake 102 of the pipe 103. As can be appreciated, the enlarged plenum is at least in part aligned with the fan cowl doors 110, and the fan control belt 199 is received within the plenum.

Prior proposed systems for creating this bleed air have included a conduit or pipe communicating the air from the downstream end to the upstream end. By utilizing the plenum 120 to communicate the air from the inlet pipe 114 to the pipe 103, the present invention eliminates a good deal of required piping and other plumbing structure.

Figure 4:
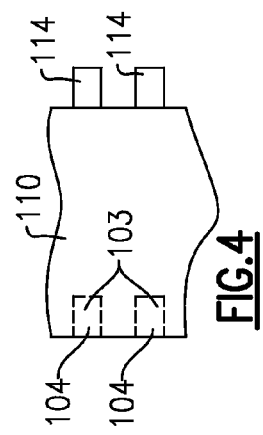
FIG. 4 schematically shows a feature.

As shown in FIG. 3, in an alternative embodiment, the pipe 105 incorporates an intake 106, and an outlet 108 that directs the air to an inner periphery of the nacelle 100. This will energize the boundary layer to reduce or eliminate flow separation While a single inlet pipe 114, pipe 103 or 105, and outlet 104 or 18 are illustrated in FIGS. 1-3, in fact, there would likely be several circumferentially spaced ones of these elements. This is schematically shown in FIG. 4.

While several embodiments of this invention have been disclosed, a worker of ordinary skill in the art would recognize that certain modifications would come within the scope of this invention. For that reason, the following claims should be studied to determine the true scope and content of this invention.

What is claimed is:

1. A gas turbine engine comprising:
   a nacelle defining an interior space;
   a fan section, a compressor section and a turbine section positioned within said nacelle, an inner cowl surrounding said compressor section and said turbine section, and said fan section delivering air to said compressor section, and bypass air between said cowl and an interior surface of said nacelle;
   an air inlet for capturing air and communicating the air into the interior space of said nacelle, said interior space defining a plenum, the air leaving said air inlet, flowing through the interior space of said nacelle, and into a passage, said passage communicating the air to a location adjacent an upstream end of said nacelle;
   a flow control for selectively blocking or allowing the flow of air through said passage to the location adjacent to the upstream end of said nacelle, and said flow control allowing the flow when it is desirable to create a thicker boundary layer at the upstream end of the nacelle;
   the air inlet is a pipe extending from an intake end in a bypass air passage defined between an outer periphery of said inner cowl, and radially inward of said nacelle, and having an outlet within the interior space; and
   the air inlet pipe extends through a wall in the nacelle, and the outlet of the air inlet pipe then opens into communication with the interior space.

2. The gas turbine engine as set forth in claim 1, wherein the passage is a pipe having an intake within the interior space.

3. The gas turbine engine as set forth in claim 1, wherein an outlet of the passage directs the air into an interior surface of the nacelle.

4. The gas turbine engine as set forth in claim 1, wherein an outlet of the air inlet has a diffuser such that the air expands as it leaves the air inlet and enters the interior space.

5. A nacelle for a gas turbine engine comprising:
   a nacelle body defining an interior space, and a central bore for creating a bypass air passage, an air inlet for capturing air and communicating the air into the interior space, said interior space defining a plenum, the air leaving said air inlet, flowing through the interior space, and into a passage, said passage communicating the air to a location adjacent an upstream end of said nacelle body;
   a flow control for selectively blocking or allowing the flow of air through said passage to the location adjacent to the upstream end of said nacelle, and said flow control allowing the flow when it is desirable to create a thicker boundary layer at the upstream end of the nacelle;
   the air inlet is a pipe extending from an intake end in a bypass air passage, and having an outlet within the interior space; and
   the air inlet pipe extends through a wall in the nacelle body, and the outlet of the air inlet pipe then opens into communication with the interior space.

6. The nacelle turbine engine as set forth in claim 5, wherein the passage is a pipe having an intake within the interior space.

7. The nacelle as set forth in claim 5, wherein an outlet of the passage directs the air into an interior surface.

8. The nacelle as set forth in claim 5, wherein an outlet of the air inlet has a diffuser such that the air expands as it leaves the air inlet and enters the interior space.

9. The gas turbine engine as set forth in claim 1, wherein said plenum provides a larger cross-sectional area for flow of the air than a downstream end of said air inlet opening into said plenum, and said passage having an upstream end with a flow cross-sectional area which is smaller than the cross-sectional area of said plenum.

10. A gas turbine engine comprising:
    a nacelle defining an interior space,
    a fan section, a compressor section and a turbine section positioned within said nacelle, an inner cowl surrounding said compressor section and said turbine section, and said fan section delivering air to said compressor section, and bypass air between said cowl and an interior surface of said nacelle;
    an air inlet for capturing air and communicating the air into the interior space of said nacelle, said interior space defining a plenum, the air leaving said air inlet, flowing through the interior space of said nacelle, and into a passage, said passage communicating the air to a location adjacent an upstream end of said nacelle;
    a flow control for selectively blocking or allowing the flow of air through said passage to the location adjacent to the upstream end of said nacelle, and said flow control allowing the flow when it is desirable to create a thicker boundary layer at the upstream end of the nacelle; and
    said plenum provides a larger cross-sectional area for flow of the air than a downstream end of said air inlet opening into said plenum, and said passage having an upstream end with a flow cross-sectional area which is smaller than the cross-sectional area of said plenum; and
    fan cowl doors are provided on an outer surface of said nacelle along a portion of said nacelle associated with said enlarged plenum, and intermediate the downstream end of said air inlet, and the upstream end of said passage.

11. The gas turbine engine as set forth in claim 10, wherein a fan control belt is mounted within said plenum.

12. The gas turbine engine as set forth in claim 1, wherein there area plurality of passages receiving air from a common plenum and a plurality of air inlets delivering air into a common plenum.

13. The nacelle as set forth in claim 5, wherein said plenum provides a larger cross-sectional area for flow of the air than a downstream end of said air inlet opening into said plenum, and said passage having an upstream end with a flow cross-sectional area which is smaller than the cross-sectional area of said plenum.

14. A nacelle for a gas turbine engine comprising:
    a nacelle body defining an interior space, and a central bore for creating a bypass air passage, an air inlet for capturing air and communicating the air into the interior space, said interior space defining a plenum, the air leaving said air inlet, flowing through the interior space, and into a passage, said passage communicating the air to a location adjacent an upstream end of said nacelle body;
    a flow control for selectively blocking or allowing the flow of air through said passage to the location adjacent to the upstream end of said nacelle, and said flow control allowing the flow when it is desirable to create a thicker boundary layer at the upstream end of the nacelle; and
    fan cowl doors are provided on an outer surface of said nacelle along a portion of said nacelle associated with said enlarged plenum, and intermediate the downstream end of said air inlet, and the upstream end of said passage.

15. The nacelle as set forth in claim 5, wherein a fan control belt is mounted within said plenum.

16. The nacelle as set forth in claim 5, wherein there are a plurality of passages receiving air from a common plenum and a plurality of air inlets delivering air into a common plenum.

\* \* \* \* \*

UNITED STATES PATENT AND TRADEMARK OFFICE
CERTIFICATE OF CORRECTION

| | | |
|---|---|---|
| PATENT NO. | : 8,657,567 B2 | Page 1 of 1 |
| APPLICATION NO. | : 11/754455 | |
| DATED | : February 25, 2014 | |
| INVENTOR(S) | : Cloft et al. | |

It is certified that error appears in the above-identified patent and that said Letters Patent is hereby corrected as shown below:

In the Claims

In claim 12, column 4, line 44: delete "area" and replace with --are a--

Signed and Sealed this
Eighth Day of July, 2014

Michelle K. Lee
*Deputy Director of the United States Patent and Trademark Office*